US011966329B2

(12) United States Patent
Frolikov (10) Patent No.: US 11,966,329 B2
(45) Date of Patent: Apr. 23, 2024

(54) ADDRESS MAP CACHING FOR A MEMORY SYSTEM (71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 314 days.

(21) Appl. No.: 15/952,087

(22) Filed: Apr. 12, 2018

(65) Prior Publication Data

US 2019/0317894 A1 Oct. 17, 2019

(51) Int. Cl.
*G06F 12/0802* (2016.01)

(52) U.S. Cl.
CPC .. *G06F 12/0802* (2013.01); *G06F 2212/2022* (2013.01); *G06F 2212/656* (2013.01)

(58) Field of Classification Search
CPC ......... G06F 12/0802; G06F 2212/2022; G06F 2212/656
See application file for complete search history.

(56) References Cited

U.S. PATENT DOCUMENTS

| 9,213,632 | B1 * | 12/2015 | Song | G06F 3/0685 |
| 10,268,584 | B2 * | 4/2019 | Hahn | G06F 12/0862 |
| 2017/0300246 | A1 * | 10/2017 | Michaeli | G06F 3/065 |
| 2019/0138220 | A1 * | 5/2019 | Hahn | G06F 3/0656 |

OTHER PUBLICATIONS

Salihun Darmawan, System address map initialization in x86/x64 architecture part 1: PCI-based systems, Sep. 16, 2013, InfoSec, https://resources.infosecinstitute.com/topic/system-address-map-initialization-in-x86x64-architecture-part-1-pci-based-systems/ (Year: 2013).*

* cited by examiner

Primary Examiner — Eric Cardwell
(74) Attorney, Agent, or Firm — Greenberg Traurig (57) ABSTRACT A memory system having non-volatile media, a volatile memory, and a controller configured to process requests from a host system to store data in the non-volatile media or retrieve data from the non-volatile media. The non-volatile media has a quantity of memory units and stores an address map that defines logical addresses used in the requests in terms of physical addresses of the memory units in the non-volatile media. The host system has a memory connected to the memory system via a communication channel. The memory system has a cache manager that stores a first portion of the address map in the volatile memory of the memory system and a second portion of the address map in the memory of the host system. In response to an operation that uses a logical address defined in the second portion, the cache manager retrieves the second portion of the address map from the memory of the host system through the communication channel to the volatile memory of the memory system.

15 Claims, 3 Drawing Sheets

ADDRESS MAP CACHING FOR A MEMORY SYSTEM

FIELD OF THE TECHNOLOGY

At least some embodiments disclosed herein relate to memory systems in general, and more particularly, but not limited to caching meta data for memory systems.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

A host system typically uses logical addresses to specify memory locations for read and write operations. A solid-state drive (SSD) typically includes a flash translation layer (FTL) that has an address map for converting the logical addresses, specified by the host system, to physical addresses of memory units of the solid-state drive (SSD) in performing read and write operations requested by the host system. As the storage capacity of a solid-state drive increases, the size of the address map increases.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to the caching of meta data of a memory system in a memory of a host system of the memory system. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

A logical to physical address map is typically used by the flash translation layer (FTL) of a solid-state drive (SSD) to perform read and write requests from the host system of the solid-state drive (SSD). The map may change in response to certain operations, such as writing data. For improved data access performance, it is desirable to cache the address map in a high performance memory of the solid-state drive (SSD).

For example, a solid-state drive (SSD) may have dynamic random access memory (DRAM) and NAND flash memory. DRAM is much faster than NAND flash memory. Thus, it is preferred to cache the address map in the DRAM for improved performance (e.g., for read and write operations). When the solid-state drive (SSD) has a large amount of NAND flash memory, the address map for converting logical addresses to physical addresses in the NAND flash memory of the solid-state drive (SSD) can have a large size; and that the DRAM of the SSD may not have a capacity that is sufficient to cache the entire address map.

Optionally, when the DRAM of the SSD does not have a sufficient capacity to cache the entire address map, only a portion of the address map is cached in the DRAM of the SSD. When another portion of the address map that is not cached in the DRAM of the SSD is required for an operation, the currently cached portion of the address map can be stored back to the NAND flash memory of the SSD and the portion of the address map required for the operation can be loaded into the DRAM to support the operation.

In some instances, the SSD can access the data in a memory of the host system faster than accessing the NAND flash memory of the SSD. Thus, the SSD can use the memory of the host system to cache at least a portion of the address map that is not currently in the DRAM of the SSD. When an operation in the SSD requires the use of a portion of the address map that is not currently in the DRAM of the SSD, the SSD may swap out of the DRAM and into the memory of the host system (instead of to the NAND flash memory of the SSD) the portion of the address map that is currently in the DRAM and swap into the DRAM and from the memory of the host system (instead of from the NAND flash memory of the SSD) the portion of the address map that is to be used in the operation. Such an arrangement improves the performance of the SSD by reducing the time in swapping the portions of the address map and improves the longevity of the SSD by reducing write operations associated with updating the address map in the NAND flash memory of the SSD.

For example, the SSD and the host system can be connected via a peripheral component interconnect express (PCIe) bus. During the booting process (e.g., power-on startup) of the host system, the hardware initialization performed by the Basic Input/Output System (BIOS) and/or the operating system of the host system can use a Base Address Register (BAR) of the SSD to specify a memory region in the memory of the host system that is shared between the SSD and the host system. The SSD can use such a portion of the memory of the host system, offset by the Base Address Register (BAR), for the caching of the address map of the SSD and/or other meta data of the SSD.

Figure 1:
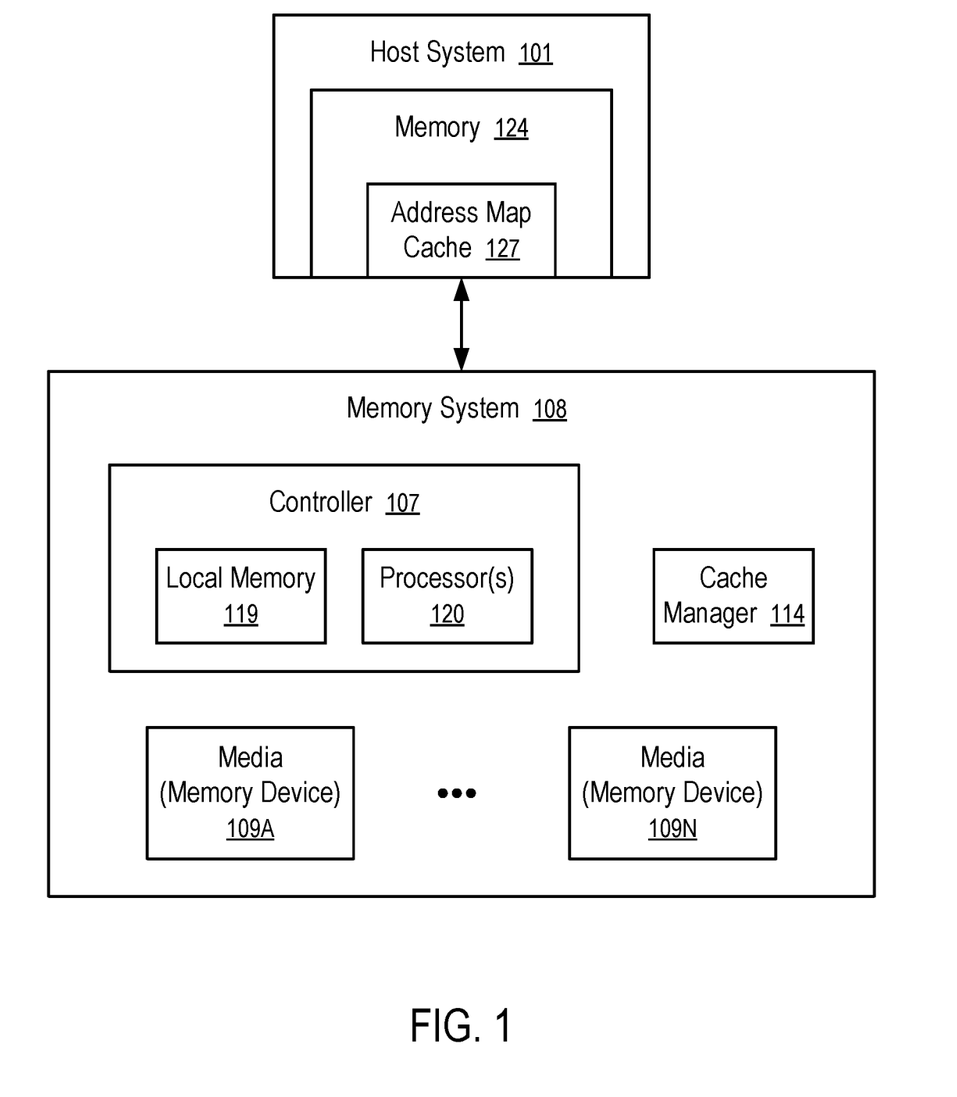
FIG. 1 shows a computing system having a memory system having a cache manager in accordance with some embodiments of the present disclosure.

FIG. 1 shows a computing system having a memory system (108) having a cache manager (114) in accordance with some embodiments of the present disclosure.

In the computing system of FIG. 1, a host system (101) has a memory (124), which can be a region or a portion of the random access memory of the host system (101). The memory (124) is configured to be accessible to the memory system (108) and/or to be shared by the host system (101) and the memory system (108). The cache manager (114) stores at least portion of the address map cache (127) in the memory (124) in the host system (101). The address map cache (127) defines the mapping between at least some logical addresses used by the host system (101) and the physical addresses of memory units in some of the memory devices (e.g., 109A, . . . , or 109N). When the mapping is required for operations in the memory system (108), the cache manager (114) accesses the corresponding address map cache (127) in the memory (124) of the host system (101) and/or loads the address map cache (127) from the memory (124) into the memory system (108) for processing by the controller (107). Since a controller (107) of the memory system (108) can access the memory (124) faster than accessing some of memory devices (e.g., 109N) of the memory system (108), the performance of the memory system (108) is improved by storing the address map cache (127) in the memory (124) of the host system (101), instead of in the memory (e.g., 109N) of the memory system (108).

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid-state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the cache manager (114), which is described in greater detail below. In some embodiments, the local memory (119) can include memory for the implementation of the cache manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
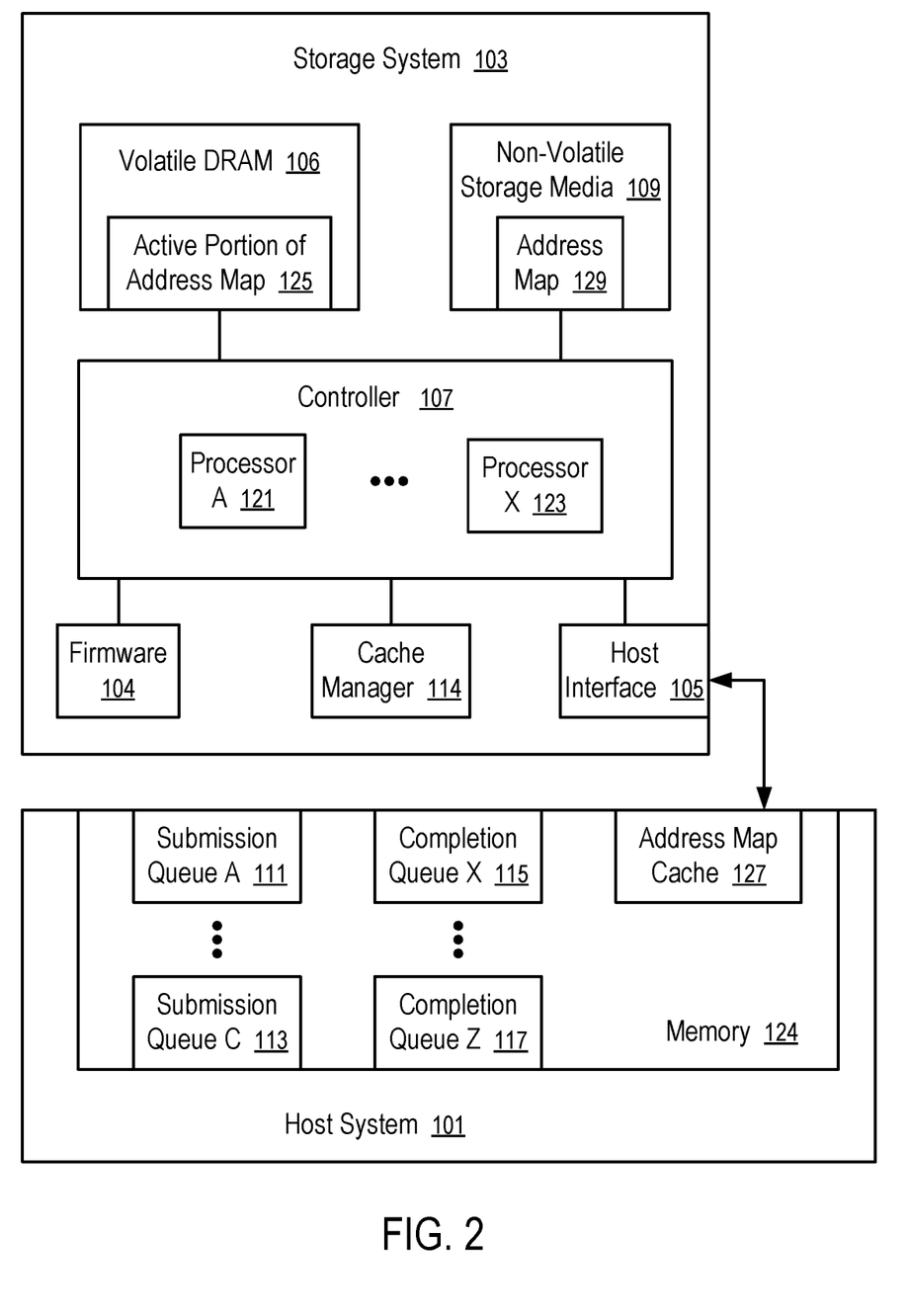
FIG. 2 shows a storage system that caches at least a portion of an address map in a memory of a host system.

FIG. 2 shows a storage system (103) that caches at least a portion of an address map (127) in a memory (124) of a host system (101). For example, the storage system (103) of FIG. 2 can be used as an example of the memory system (108) in the computing system of FIG. 1.

The storage system (103) of FIG. 2 has a controller (107) executing firmware (104) to store data in or retrieve data from non-volatile storage media (109) using resources, such as volatile memory (106), registers, stacks, inter-process communication channels, in response to requests/commands communicated from the host system (101) via a host interface (105).

The controller (107) has a plurality of processors (121, . . . , 123) that can be configured via the firmware (104) to run a plurality of processes that perform respectively a plurality of predefined types of tasks. Tasks of each type provide a core functionality of the storage system (103). Optionally, each process running a processor (e.g., 121) to perform a type of tasks is controlled by a respective task manager running in the processor (e.g., 121) in the controller (107).

For example, a flash translation layer manager can perform a type of tasks of translating a logical address to a physical address that is usable to address a memory unit in the non-volatile storage media (109).

For example, an input/output manager can perform a type of tasks of accessing the non-volatile storage media (109) to store data or retrieve data using a physical address.

For example, an administrative manager can perform a type of tasks of processing administrative commands, such as the creation or deletion of a namespace, the allocations of resources, etc.

The processes running the controller (107) may store operation data and/or meta data of the storage system (103) in volatile DRAM (106). For example, the flash translation layer manager stores, in the volatile DRAM (106), an active portion (125) of an address map between logical addresses and physical addresses.

For example, when the host system (101) requests the storage system (103) to store a data item at a logical address, the flash translation layer (e.g., running in a processor (e.g., 121 or 123) of the controller) uses the address map to convert the logical address to a physical address that can be used in the non-volatile storage media (109) to select a memory unit to store the data item.

When the relation between the logical address and the physical address is defined in the active portion (125) of the address map (129), the flash translation layer (e.g., running in a processor (e.g., 121 or 123) of the controller) uses the active portion (125) of the address map (129) to compute the physical address.

However, the volatile DRAM (106) may not have a sufficient capacity to store the entire address map (129) to identify the physical addresses of the entire set of the memory units in the non-volatile storage media (109). Thus, only a portion (125) of the address map (129) is loaded in the volatile DRAM (106).

When the logical address of the request to write the data item is not in the active portion (125), the cache manager (114) can obtain the relevant address definition from the address map cache (127) stored in the memory (124) of the host system 9101) and/or replaces the active portion (125) of the address map (129) with at least a portion of the address map cache (127) stored in the memory (124) of the host system (101). Once the new active portion (125) of the address map (129) in the volatile DRAM (106) defines the logical address of the request and other logical addresses that are likely to be used in the subsequent operations, the storage system (103) can perform the operations efficiently.

In some implementations, the memory (124) of the host system stores the address map (129) other than the active portion (125) of the address map (129) that is currently in the volatile DRAM (106). To load a new active portion of the address map (129) into the volatile DRAM (106), the cache manager (114) identifies a relevant portion of the address map cache that defines the physical address of the logical address of the request to write the data item, and swaps out the existing active portion (125) of the address map (129) from the volatile DRAM (106) for the relevant portion of the address map cache (127) from the memory (124) of the host system (101). Thus, after the swap, the portion of the address map (129) previously in the volatile DRAM (106) is moved into the memory (124) of the host system (101); and the relevant portion of the address map (129) for the request is moved from the memory (124) of the host system (101) into the volatile DRAM (106).

In some implementations, the memory (124) of the host system (101) stores the complete address map. Thus, when the active portion (125) of the address map (129) has a corresponding copy in the memory (124), the cache manager (114) identifies the relevant portion of the address map cache (127) that defines the physical address of the logical address of the request to write the data item, and copies the relevant portion of the address map cache (127) from the memory (124) to the volatile DRAM (106) to replace the existing portion (125) of the address map (129).

In some instances, the active portion (125) of the address map is updated in response to one or more prior operations. Thus, the corresponding portion of the address map (129) in the address map cache (127), corresponding to the active portion (125) of the address map (129), may be out of date. Thus, the cache manager (114) updates the address map cache (127) according to the active portion (125) in the volatile DRAM (106), before copying the relevant portion of the address cache (127) from the memory (124) of the host system (101) to the volatile DRAM (106) to replace its existing active portion (125) of the address map (129).

During a shutdown process of the storage system (103), the cache manager (114) downloads the address map cache (127) from the memory (124) of the host system (101) and stores it and/or the active portion (125) of the address map (129) in the non-volatile storage media (109). For example, a portion of the non-volatile storage media (109) can be reserved for the storage of meta data of the storage system (103), such as the address map (129) of the storage system (103).

During a startup process of the storage system (103), the cache manager (114) loads the address map (129) into the volatile DRAM (106) and the memory (124) of the host system (101) as the active portion (102) of the address map (129) and the address map cache (127) respectively.

In general, the host system (101) can use message queues to submit requests/commands that are processed by the task managers running in the processors (121, . . . , 123).

For example, a submission queue (e.g., 111, . . . , or 113) can be used by the host system (101) to submit requests to the storage system (103); and a completion queue (e.g., 115, . . . , or 117) can be used by the host system (101) to receive responses from the storage system (103).

For example, a version of NVMe (e.g., Non-Volatile Memory Host Controller Interface Specification 1.2) specifies the use of a circular buffer with a fixed slot size for a submission queue (e.g., 111, . . . , or 113) or a completion queue (e.g., 115, . . . , or 117).

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage system (103), commands to write data into the storage system (103), commands to compare data in the storage system (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the storage system (103) fetch the commands/requests from a submission queue (111, . . . , or 113) according to the order in which the commands are placed in the submission queue (111, . . . , or 113). However, the NVMe allows the controller (107) to execute the fetched commands in any order.

Figure 3:
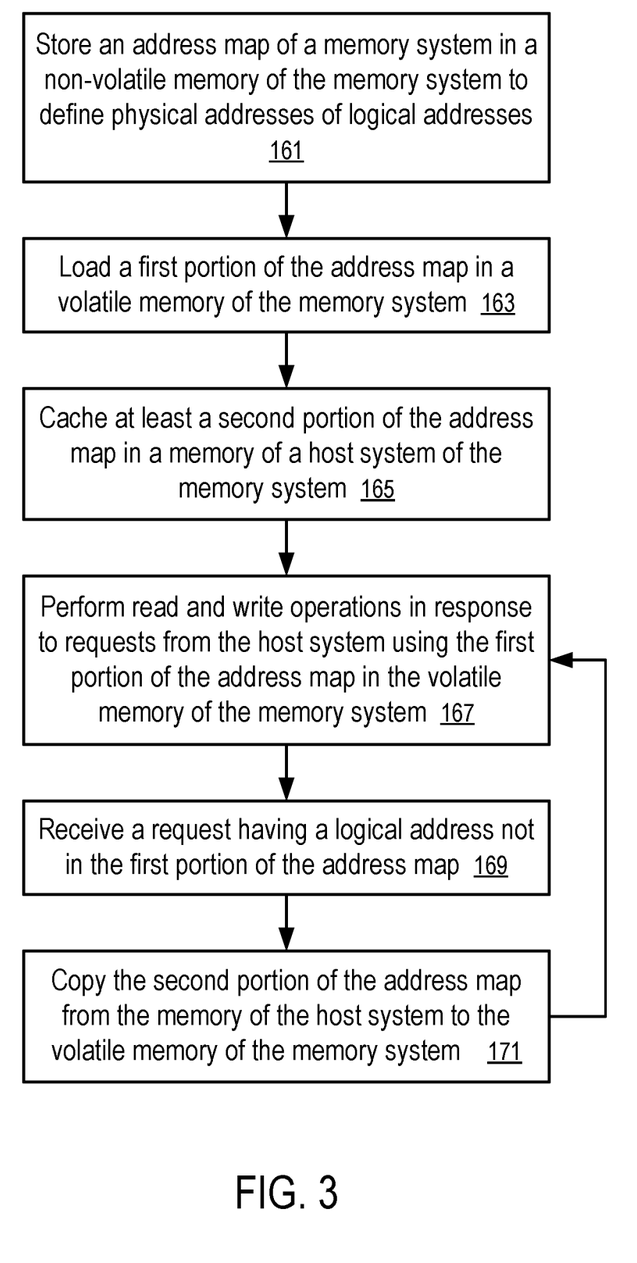
FIG. 3 shows a method to cache data in a memory system.

FIG. 3 shows a method to cache data in a memory system. For example, the method of FIG. 3 can be used in the memory system (108) of FIG. 1 in general and in the storage system (103) of FIG. 2 as an example.

The method of FIG. 3 includes: storing (161) an address map (129) of a memory system (e.g., 108 or 103) in a non-volatile memory (109) of the memory system (e.g., 108 or 103) to define physical addresses of logical addresses; loading (163) a first portion (e.g., 125) of the address map in a volatile memory (e.g., 119, 109A, or 106) of the memory system (e.g., 108 or 103); caching (165) at least a second portion (e.g., 127) of the address map in a memory (124) of a host system (101) of the memory system (e.g., 108 or 103); performing (167) read and write operations in response to requests from the host system (101) using the first portion (e.g., 125) of the address map stored in the volatile memory (e.g., 119, 109A, or 106) of the memory system (e.g., 108 or 103); receiving (169) a request having a logical address not in the first portion (e.g., 125) of the address map; and copying (171) the second portion (e.g., 127) of the address map from the memory (124) of the host system (101) to the volatile memory (e.g., 119, 109A, or 106) of the memory system (e.g., 108 or 103).

During the performance (167) of write operations using the using the first portion (e.g., 125) of the address map stored in the volatile memory (e.g., 119, 109A, or 106) of the memory system (e.g., 108 or 103), the corresponding portion (e.g., 125) of the address map can be changed and/or updated. Thus, after the performance (167) of write operations made using the using the first portion (e.g., 125) of the address map (129) stored in the volatile memory (e.g., 119, 109A, or 106) of the memory system (e.g., 108 or 103), the volatile memory (e.g., 119, 109A, or 106) of the memory system (e.g., 108 or 103) stores the most up to date version of the corresponding portion of the address map (129). Before the most up to date version of the corresponding portion (125) of the address map (129) is replaced, in the volatile memory (e.g., 119, 109A, or 106) of the memory system (e.g., 108 or 103), with the second portion (e.g., 127) of the address map (129) copied from the memory (124) of the host system (101), the most up to date version of the corresponding portion (125) of the address map (129) is stored in the memory (124) of the host system (101) and/or the non-volatile memory (109) of the memory system (e.g., 108 or 103). To shut down the memory system (e.g., 108 or 103) for powering off, the changes in the active portion (125) of the address map (129) and/or in the address map cache (127) are committed to the non-volatile storage media (109).

For example, a memory system (e.g., 108 or 103) includes non-volatile media (e.g., 109N or 109) having a quantity of memory units, a volatile memory (e.g., 109A or 106), and a controller (107) configured to process requests from a host system (101) to store data in the non-volatile media (e.g., 109N or 109) or retrieve data from the non-volatile media (e.g., 109N or 109).

The memory system (e.g., 108 or 103) has an address map (129) that defines logical addresses in terms of physical addresses of the memory units in the non-volatile media (e.g., 109N or 109). The host system (101) has a memory (124) connected to the memory system (108) via a communication channel.

A cache manager (114) of the memory system (e.g., 108 or 103) caches a first portion (125) of the address map (129) in the volatile memory (e.g., 109A or 106) and caches a second portion (127) of the address map (129) in the memory (124) of the host system (101).

When an operation uses a logical address defined in the second portion (127) but not in the first portion (125), the cache manager (114) retrieves the second portion (127) of the address map (129) from the memory (124) of the host system (101) through the communication channel and/or uses the retrieved portion (127) to replace the existing portion (125) previously cached in the volatile memory (e.g., 109A or 106) of the memory system (e.g., 108 or 103).

The non-volatile media (e.g., 109N or 109) can include a flash memory; the memory system (e.g., 108 or 103) can be a solid-state drive (SSD); and the memory (124) of the host system (101) is accessible to the controller (107) of the memory system (e.g., 108 or 103) at a speed greater than accessing the non-volatile media (109). Thus, caching at least a portion of the address map (129) in the memory (124) of the host system (101) can improve the data access performance of the memory system (e.g., 108 or 103). Further, updating the address map (109) in the volatile memory (e.g., 109A or 106) of the memory system (e.g., 108 or 103) and/or the memory (124) of the host system (101)

before a shutdown operation can reduce write operations to the non-volatile storage media (109) of the memory system (e.g., 108 or 103) and thus improve longevity of the memory system (e.g., 108 or 103).

When an operation uses a logical address defined in the second portion (127) cached in the memory (124) of the host system (101) but not in the volatile memory (106) of the memory system (e.g., 108 or 103), the cache manager (114) can swap the second portion (127) and the first portion (125) between storing in the memory (124) of the host system (101) and storing the volatile memory (106) of the memory system (e.g., 108 or 103), such that the first portion (125) of the address map (129) is backed up from the volatile memory (109A or 106) of the memory system (e.g., 108 or 103) through the communication channel into the memory (124) of the host system (101).

In some instances, the cache manager (114) predicts whether the second portion (127) of the address map (129) that is currently cached in the memory (124) of the host system (101) will be used more frequently than the first portion (125) of the address map (129) that is currently cached in the volatile memory (e.g., 109A or 106) of the memory system (e.g., 108 or 103) in subsequent operations; and if so, the cache manager (114) performs the swap. Otherwise, the cache manager (114) may optionally directly use the second portion (127) of the address map (129) cached in the memory (124) of the host system (101) without using the second portion (127) to replace the first portion (125) in the volatile memory (e.g., 109A or 106) of the memory system (e.g., 108 or 103).

In some implementations, the cache manager (114) caches the entire address map (129) in the memory (124) of the host system (101); and the most frequently used portion of the address map (129) is further cached in the volatile memory (e.g., 129A or 106) of the memory system (e.g., 108 or 103). When the entire address map (129) is cached in the memory (124) of the host system (101), the cache manager (114) can further store the changes to the active portion (125) of the address map (129) in the memory (124) of the host system (101).

The cached portions (125 and 127) of the address map (129) can be updated during operations that involve logical addresses defined in the corresponding cached portions (125 and 127) of the address map (129). For example, write operations performed on logical addresses can cause the change of the physical addresses of the logical addresses (e.g., when free memory units are identified and allocated on demand to store the data involved in the write operations).

In response to a request to shut down the memory system (e.g., 108 or 103), the cache manager (114) stores or commits, in the non-volatile media (109), the changed/updated portions (127 and 125) of the address map (129) from the memory (124) of the host system (101) and/or the volatile memory (e.g., 109A or 106) of the memory system (e.g., 108 or 103).

After powering down the memory system (e.g., 108 or 103), the non-volatile media (109) stores the most up to date version of the address map (129). During powering up of the memory system (e.g., 108 or 103), the cache manager (114) copies caches the first portion (125) of the address map (129) from the non-volatile media (109) to the volatile memory (e.g., 109A or 106) and at least the second portion (127) of the address map (129) from the non-volatile media (109) to the memory (124) of the host system (101).

The memory (124) can be a portion of the random access memory of the host system (101) that is identified to the memory system (e.g., 108 or 103) during the powering up setup operation (e.g., BIOS setup). For example, the powering up setup operation can specify the memory (124) for sharing between the storage system (103) and the host system (101) using a base address register of the storage system (103).

In some implementations, the memory (124) of the host system (101) is also used to host message queues (e.g., 111, . . . , 113, 115, . . . , 117) for communications between the host system (101) and the memory system (e.g., 108 or 103).

For example, the storage system (103) communicates with the host system (101) using a host interface (105) over the communication channel in accordance with a communication protocol for peripheral component interconnect express (PCIe) bus.

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as data write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A solid-state drive memory system, comprising:
   non-volatile media having a quantity of memory units, wherein the non-volatile media includes a flash memory, and wherein an address map is stored in the non-volatile media;
   a volatile memory that stores a first portion of the address map, the address map defining logical addresses in terms of physical addresses of the memory units in the non-volatile media; and
   a controller configured to process requests from a host system to store data in the non-volatile media or retrieve data from the non-volatile media, the host system having a memory connected to the memory system via a communication channel;
   wherein a cache manager stores a second portion of the address map in the memory of the host system;
   wherein in response to an operation that uses a logical address defined in the second portion, the cache manager is configured to swap the first portion of the address map and the second portion of the address between the volatile memory of the solid-state drive memory system and the memory of the host system by:
      retrieving the second portion of the address map from the memory of the host system through the communication channel and storing the second portion of the address map in the volatile memory of the memory system;
      transmitting the first portion of the address map from the volatile memory of the memory system through the communication channel to the memory of the host system;
   wherein the memory of the host system is accessible to the controller at a speed greater than accessing the non-volatile media; and
   wherein the memory of the host system is identified to the memory system during the powering up via a base address register;
   wherein, before the first portion of the address map has been swapped into the memory of the host system, the first portion of the address map is changed or updated:
      while the first portion of the address map is stored in the volatile memory of the memory system, and
      during first operations involving logical addresses defined in the first portion of the address map, wherein the first operations are performed by the controller responsive to a first request from the host system;
   wherein, after the second portion of the address map has been swapped into the volatile memory of the memory system, the second portion of the address map is changed or updated:
      while the second portion of the address map is stored in the volatile memory of the memory system, and
      during second operations involving logical addresses defined in the second portion of the address map, wherein the second operations are performed by the controller responsive to a second request from the host system;
   wherein, after the second portion of the address map has been swapped into the volatile memory of the memory system and the first portion of the address map has been swapped into the memory of the host system, in response to a request to shut down the memory system, the cache manager stores, in the non-volatile media of the memory system, the second portion of the address map from the volatile memory of the memory system that has been changed or updated during the second operations; and
   wherein further in response to the request to shut down the memory system, the cache manager stores, in the non-volatile media of the memory system, the first portion of the address map from the memory of the host system that has been changed or updated during the first operations, such that changes to both of the first portion and the second portion of the address map resulting from the first operations and the second operations, respectively, are saved in the address map stored in the non-volatile memory upon shutdown of the memory system;
   wherein the controller is configured to perform, in response to a first request associated with the first operations, a real time analysis of data stored in the memory of the memory system, wherein the data stored in the memory of the memory system comprises sensor data collected from a plurality of sensors, and wherein the plurality of sensors are real time sensors connected to the memory system;
   wherein the controller is configured to determine, based on the real time analysis, a reduced data set responsive to the first request; and
   wherein the controller is configured to communicate the reduced data set to the host system.

2. The memory system of claim 1, wherein the first portion of the address map is updated during at least write operations made using logical addresses defined in the first portion of the address map.

3. The memory system of claim 2, wherein the host system and the memory system communicate over the communication channel in accordance with a communication protocol for peripheral component interconnect express bus.

4. The memory system of claim 2, wherein the memory of the host system is accessible to the controller at a speed greater than accessing the non-volatile media.

5. The memory system of claim 1, wherein during powering up the memory system, the cache manager copies the first portion of the address map from the non-volatile media to the volatile memory and the second portion of the address map from the non-volatile media to the memory of the host system.

6. The memory system of claim 1, wherein the memory of the host system includes message queues for communications between the host system and the memory system.

7. The memory system of claim 1, wherein the controller only processes the requests from the host system using address map portions that are stored on the volatile memory.

8. The memory system of claim 1, wherein the controller does not process the requests from the host system using address map portions that are stored in the memory of the host system.

9. A method, comprising:
storing, in non-volatile media of a memory system having a quantity of memory units, an address map, the address map defining logical addresses in terms of physical addresses of the memory units in the non-volatile media;
loading, by a cache manager of the memory system, a first portion of the address map in a volatile memory of the memory system;
processing, by a controller of the memory system, requests from a host system to store data in the non-volatile media or retrieve data from the non-volatile media, the host system having a memory connected to the memory system via a communication channel;
loading, by the cache manager, a second portion of the address map in the memory of the host system;
changing or updating, during first operations involving logical addresses defined in the first portion of the address map stored in the volatile memory of the memory system, the first portion of the address map stored in the volatile memory of the memory system;
after the changing or updating of the first portion of the address map stored in the volatile memory of the memory system, and in response to an operation that uses a logical address defined in the second portion, the cache manager is configured to swap the first portion of the address map and the second portion of the address between the volatile memory of the solid-state drive memory system and the memory of the host system by:
retrieving the second portion of the address map from the memory of the host system through the communication channel and storing the second portion of the address map in the volatile memory of the memory system;
transmitting, by the cache manager, the first portion of the address map from the volatile memory of the memory system through the communication channel to the memory of the host system; and
identifying, during the powering up, the memory of the host system via a base address register;
after the second portion of the address map is swapped into the volatile memory of the memory system, changing or updating, during second operations involving logical addresses defined in the second portion of the address map, the second portion of the address map;
receiving, at the cache manager a request to shut down the memory system; and
after the second portion of the address map is swapped into the volatile memory of the memory system, storing, in the non-volatile media of the memory system by the cache manager in response to the request, the second portion of the address map from the volatile memory of the memory system that has been changed or updated during the second operations; and
after the first portion of the address map is swapped into the memory of the host system, storing, in the non-volatile media of the memory system by the cache manager in response to the request, the first portion of the address map from the memory of the host system that has been changed or updated during the first operations;
wherein the memory of the host system is accessible to the controller at a speed greater than accessing the non-volatile media;
wherein the non-volatile media includes a flash memory and the memory system is a solid-state drive;
performing, by the controller in response to a first request associated with the first operations, a real time analysis of data stored in the memory of the memory system, wherein the data stored in the memory of the memory system comprises sensor data collected from a plurality of sensors, and wherein the plurality of sensors are real time sensors connected to the memory system;
determining, by the controller based on the real time analysis, a reduced data set responsive to the first request; and
communicating, by the controller, the reduced data set to the host system.

10. The method of claim 9, wherein the host system and the memory system communicate over the communication channel in accordance with a communication protocol for peripheral component interconnect express bus; and the memory of the host system is accessible to the controller at a speed greater than accessing the non-volatile media.

11. The method of claim 10, further comprising:
during powering up the memory system, copying by the cache manager the first portion of the address map from the non-volatile media to the volatile memory and the second portion of the address map from the non-volatile media to the memory of the host system.

12. The method of claim 9, further comprising:
receiving, from message queues formed on the memory of the host system, the requests from the host system to store data in the non-volatile media or retrieve data from the non-volatile media, wherein the requests identify memory locations using the logical addresses defined using the address map in terms of the physical addresses of the memory units in the non-volatile media.

13. The method of claim 9, wherein the loading, by the cache manager of the memory system, of the first portion of the address map in the volatile memory of the memory system comprises caching a most frequently used portion of the address map as the first portion of the address map in the volatile memory of the memory system.

14. A non-transitory computer storage medium storing instructions which, when executed by a memory system having non-volatile media, a volatile memory, and a controller, cause the memory system to perform a method, the method comprising:

- storing, in the non-volatile media having a quantity of memory units, an address map, the address map defining logical addresses in terms of physical addresses of the memory units in the non-volatile media;
- loading a first portion of the address map in a volatile memory of the memory system;
- loading a second portion of the address map in the memory of the host system;
- processing requests from a host system to store data in the non-volatile media or retrieve data from the non-volatile media, the host system having a memory connected to the memory system via a communication channel;
- in response to a first operation that uses a first logical address defined in the first portion of the address map in the volatile memory of the memory system, obtaining a first relevant address definition from the first portion of the address map stored in the volatile memory of the memory system;
- completing the first operation using the first relevant address definition from the first portion;
- in response to a second operation that uses a second logical address defined in the second portion of the memory of the host system, obtaining via the communication channel a second relevant address definition from the second portion of the address map stored in the memory of the host system;
- completing the second operation using the second relevant address definition from the second portion;
- changing or updating, during first operations involving logical addresses defined in the first portion of the address map stored in the volatile memory of the memory system, the second portion of the address map stored in the volatile memory of the memory system;
- changing or updating, during second operations involving logical addresses defined in the second portion of the address map cached in the memory of the host system, the second portion of the address map cached in the memory of the host system;
- receiving, at the cache manager a request to shut down the memory system;
- in the non-volatile media of the memory system by the cache manager in response to the request, storing:
  - the first portion of the address map from the volatile memory of the memory system that has been changed or updated during the first operations, and
  - the second portion of the address map from the host system that has been changed or updated during the second operations;
- wherein the memory of the host system is accessible to the controller at a speed greater than accessing the non-volatile media;
- performing, in response to a first request associated with the first operations, a real time analysis of data stored in the memory of the memory system, wherein the data stored in the memory of the memory system comprises sensor data collected from a plurality of sensors, and wherein the plurality of sensors are real time sensors connected to the memory system;
- determining, based on the real time analysis, a reduced data set responsive to the first request; and
- communicating the reduced data set to the host system.

15. The non-transitory computer storage medium of claim 14, wherein the method further comprises:

- identifying, during powering up of the memory system, the memory of the host system via a base address register; and
- receiving, from message queues formed on the memory of the host system, the requests from the host system to store data in the non-volatile media or retrieve data from the non-volatile media, wherein the requests identify memory locations using the logical addresses defined using the address map in terms of the physical addresses of the memory units in the non-volatile media.

* * * * *